(12) United States Patent
Shields et al.

(10) Patent No.: US 10,077,370 B2
(45) Date of Patent: Sep. 18, 2018

(54) NON-NEWTONIAN PHOTO-CURABLE INK COMPOSITION

(71) Applicant: Hewlett-Packard Development Company, L.P., Houston, TX (US)

(72) Inventors: James P. Shields, Corvallis, OR (US); Raymond Adamic, Corvallis, OR (US); Sundar Vasudevan, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/512,814

(22) PCT Filed: Sep. 26, 2014

(86) PCT No.: PCT/US2014/057721
§ 371 (c)(1),
(2) Date: Mar. 20, 2017

(87) PCT Pub. No.: WO2016/048358
PCT Pub. Date: Mar. 31, 2016

(65) Prior Publication Data
US 2017/0260411 A1    Sep. 14, 2017

(51) Int. Cl.
| | |
|---|---|
| *C08F 2/46* | (2006.01) |
| *C08F 2/50* | (2006.01) |
| *C08G 61/04* | (2006.01) |
| *C09D 11/38* | (2014.01) |
| *C09D 11/033* | (2014.01) |
| *C09D 11/101* | (2014.01) |
| *C09D 11/106* | (2014.01) |
| *C09D 11/107* | (2014.01) |
| *C09D 11/322* | (2014.01) |

(52) U.S. Cl.
CPC .......... *C09D 11/38* (2013.01); *C09D 11/033* (2013.01); *C09D 11/101* (2013.01); *C09D 11/106* (2013.01); *C09D 11/107* (2013.01); *C09D 11/322* (2013.01)

(58) Field of Classification Search
CPC ..... C09D 11/38; C09D 11/101; C09D 11/107; C09D 11/033; C09D 11/106; C09D 11/322
USPC ............... 522/42, 33, 6, 189, 184, 1; 520/1
See application file for complete search history.

(56) References Cited

U.S. PATENT DOCUMENTS

| | | | |
|---|---|---|---|
| 4,591,612 A | 5/1986 | Quinn et al. | |
| 4,925,773 A | 5/1990 | Miyamura et al. | |
| 5,275,646 A | 1/1994 | Marshall et al. | |
| 6,017,660 A | 1/2000 | Palazzotto et al. | |
| 6,447,883 B1 | 9/2002 | Chen et al. | |
| 6,467,897 B1 | 10/2002 | Wu et al. | |
| 7,459,014 B2* | 12/2008 | Breton | C09D 11/101 106/31.13 |
| 7,638,075 B2 | 12/2009 | Quinn et al. | |
| 7,803,221 B2 | 9/2010 | Madassi et al. | |
| 8,163,077 B2 | 4/2012 | Eron et al. | |
| 8,207,242 B2 | 6/2012 | Nomoto et al. | |
| 8,215,764 B2 | 7/2012 | Sano et al. | |
| 8,226,226 B2 | 7/2012 | Kawakami et al. | |
| 8,303,838 B2 | 11/2012 | Iftime et al. | |
| 8,506,070 B2 | 8/2013 | Oyanagi | |
| 8,733,923 B2 | 5/2014 | Onishi | |
| 8,735,461 B2 | 5/2014 | Gruner et al. | |
| 8,757,765 B2 | 6/2014 | Matsumoto et al. | |
| 2002/0157567 A1 | 10/2002 | Erdtmann et al. | |
| 2006/0089442 A1 | 4/2006 | Mennig et al. | |
| 2006/0160917 A1 | 7/2006 | Oyanagi et al. | |
| 2007/0097195 A1 | 5/2007 | Nishino | |
| 2007/0119340 A1 | 5/2007 | Breton et al. | |
| 2007/0167545 A1 | 7/2007 | Sugerman et al. | |
| 2007/0196596 A1 | 8/2007 | Beer et al. | |
| 2007/0211110 A1 | 9/2007 | Iftime et al. | |
| 2007/0215003 A1 | 9/2007 | Kasai | |

(Continued)

FOREIGN PATENT DOCUMENTS

| | | |
|---|---|---|
| CN | 102653650 | 9/2012 |
| CN | 103160168 | 6/2013 |

(Continued)

OTHER PUBLICATIONS

International Search Report and Written Opinion for International Application No. PCT/US2014/057721 dated May 22, 2015, 10 pages.
International Search Report and Written Opinion for International Application No. PCT/US2014/057741 dated May 29, 2015, 11 pages.
International Search Report and Written Opinion for International Application No. PCT/US2014/057748 dated May 22, 2015, 10 pages.
International Search Report and Written Opinion for International Application No. PCT/US2014/067816 dated May 21, 2015, 11 pages.

(Continued)

*Primary Examiner* — Jessica Whiteley
(74) *Attorney, Agent, or Firm* — HP Inc. Patent Department

(57) ABSTRACT

A non-Newtonian photo-curable ink composition that comprises a structured network forming agent in an amount ranging from about 0.1 wt % to about 20 wt % by total weight of the ink composition; a salt in an amount ranging from about 0.05 wt % to about 20 wt % by total weight of the ink composition; an organic solvent; a photo-initiator; and a polymerizable material; wherein the ink composition has a first dynamic viscosity ranging from 25 cps to 10,000 cps at a first state and a second dynamic viscosity ranging from 1 cps to 50 cps at a second state. Also described herein is a method for making such non-Newtonian photo-curable ink composition and a method for producing printed images using such non-Newtonian photo-curable ink composition.

18 Claims, No Drawings

(56) References Cited

U.S. PATENT DOCUMENTS

| | | |
|---|---|---|
| 2007/0279467 A1* | 12/2007 | Regan .................. C09D 11/101 347/100 |
| 2008/0045618 A1 | 2/2008 | Nagvekar |
| 2008/0090930 A1 | 4/2008 | Madhusoodhanan et al. |
| 2009/0110843 A1* | 4/2009 | Halahmi .............. C09D 11/101 427/511 |
| 2009/0163615 A1 | 6/2009 | Halahmi et al. |
| 2009/0202795 A1 | 8/2009 | Hayata et al. |
| 2009/0221736 A1 | 9/2009 | Mccurry |
| 2010/0039463 A1 | 2/2010 | Van Thillo et al. |
| 2010/0289859 A1 | 11/2010 | Oyanagi et al. |
| 2012/0026236 A1 | 2/2012 | Fujii |
| 2012/0225968 A1 | 9/2012 | Nakano et al. |
| 2012/0287213 A1 | 11/2012 | Engel et al. |
| 2012/0295082 A1 | 11/2012 | Toyoda et al. |
| 2013/0010040 A1 | 1/2013 | Sekiguchi et al. |
| 2013/0065031 A1 | 3/2013 | Kasperchik et al. |
| 2013/0141505 A1 | 6/2013 | Ikeda et al. |
| 2013/0150481 A1 | 6/2013 | Hood et al. |
| 2013/0176368 A1 | 7/2013 | Wheeler |
| 2013/0265376 A1 | 10/2013 | Gil-Torrente et al. |
| 2014/0035995 A1 | 2/2014 | Chou et al. |
| 2014/0114021 A1 | 4/2014 | Okada et al. |
| 2014/0141213 A1 | 5/2014 | Kagose |
| 2016/0355696 A1* | 12/2016 | Adamic, Jr. ......... C09D 11/322 |
| 2016/0362573 A1* | 12/2016 | Adamic ................ C09D 11/322 |
| 2017/0051171 A1* | 2/2017 | Adamic ................ B41M 5/0023 |
| 2017/0174917 A1* | 6/2017 | Adamic ................ C09D 11/40 |
| 2017/0247554 A1* | 8/2017 | Shields ................ C09D 11/033 |
| 2017/0260407 A1 | 9/2017 | Shields et al. |
| 2017/0260411 A1 | 9/2017 | Shields et al. |
| 2017/0335121 A1* | 11/2017 | Shields ................ C09D 11/101 |

FOREIGN PATENT DOCUMENTS

| | | |
|---|---|---|
| DE | 19515756 | 10/1996 |
| EP | 2481782 | 8/2012 |
| JP | 2000327980 | 11/2000 |
| JP | 2004027154 | 1/2004 |
| JP | 2006152064 | 6/2006 |
| JP | 2009096910 | 5/2009 |
| JP | 2011012245 | 1/2011 |
| JP | 2013014740 | 1/2013 |
| JP | 2013185040 | 9/2013 |
| WO | WO-02/46323 | 6/2002 |
| WO | WO2010094522 | 8/2010 |

OTHER PUBLICATIONS

International Search Report and Written Opinion for International Application No. PCT/US2014/069769 dated Jul. 24, 2015, 9 pages.

* cited by examiner

NON-NEWTONIAN PHOTO-CURABLE INK COMPOSITION

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Inks used in such technologies can be liquid dispersions, solution, or emulsions and can include oil-based inks, non-aqueous solvent based inks, water-based inks and solid inks Current inkjet printing technology involves forcing the ink drops through small nozzles by thermal ejection, piezoelectric pressure or oscillation, onto the surface of a media. The deposited ink droplets are, then, dried, e.g., using heat or forced air, or allowed to dry at ambient conditions.

Curing of ink by radiation and, in particular, ultraviolet (UV) curing, has become popular. In these cases, special ink is used and the image is cured by exposure to a radiation source. The uses of such radiation-curable (or photo-curable) inks and the curing process are rapidly becoming an alternative to the established printing process. Accordingly, investigations continue into developing radiation-curable ink compositions that exhibit, when printed, specific and excellent printing properties such as, for example, jetting properties as well as improved adhesion.

DETAILED DESCRIPTION

The present disclosure refers to a non-Newtonian photo-curable ink composition that comprises a structured network forming agent in an amount ranging from about 0.1 wt % to about 20 wt % by total weight of the ink composition; a salt in an amount ranging from about 0.05 wt % to about 20 wt % by total weight of the ink composition; an organic solvent; a photo-initiator, and a polymerizable material; wherein the ink composition has a first dynamic viscosity ranging from 25 cps to 10,000 cps at a first state and a second dynamic viscosity ranging from 1 cps to 50 cps at a second state. The present disclosure refers also to a method for making such non-Newtonian photo-curable ink composition and to a method for producing printed images using such non-Newtonian photo-curable ink composition Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present composition and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. The percent are by weight (wt %) unless otherwise indicated. As used herein, "image" refers to marks, signs, symbols, figures, indications, and/or appearances deposited upon a material or substrate with either visible or an invisible ink composition.

The ink composition according to the present disclosure is a non-Newtonian photo-curable ink composition. As used herein, the term "ink" refers to a composition that can be colorant free or that can, alternatively, include colorant. Therefore, it should be noted that when referring to an "ink" or an "ink composition" this does not infer that a colorant necessarily be present. The ink composition is photo-curable or UV-curable or radiation-curable ink composition. By "curable", it is meant here that said ink can be cured. The term "cure", in the context of the present disclosure, refers to a process of converting a liquid, such as ink, into a solid by exposure to actinic radiation such as photo-radiation, e.g., ultraviolet (UV) radiation. Such ink compositions are commonly referred to as "energy-curable" inks to distinguish them from "solvent-based" inks. In the uncured state, ink compositions are readily jetted. However, upon exposure to suitable source of curing energy, for example ultraviolet (UV) light, electron beam energy, and/or the like, there is a formation of a cross-linked polymer network.

The ink compositions of the present disclosure are non-Newtonian photo-curable inkjet ink compositions, meaning thus that they can be used in inkjet printing systems. Indeed, the ink composition as described herein can be printed via inkjet technology as the viscosity of the non-Newtonian ink compositions can be lowered using shear or thermal forces within an inkjet printhead. Once exiting the printhead, the viscosity of the non-Newtonian compositions rapidly increases (e.g. within a few seconds or immediately) via self-assembly of a structured network within the non-Newtonian ink compositions. It is believed that the structured network, within the non-Newtonian ink compositions, can be assembled through interaction between the metal oxides and facilitated by salts.

The ink composition is a non-Newtonian ink composition. The wording "non-Newtonian" refers to a composition where the viscosity of the composition can be manipulated by physical forces. The viscosity (the measure of a fluid's ability to resist gradual deformation by shear or tensile stresses) of non-Newtonian fluids is dependent on an applied force such as shear or is dependent on applied thermal forces. For example, shear thinning fluids decrease in viscosity with increasing rate of shear or with increasing rate of heat. The non-Newtonian ink composition as described therein can show, therefore, these same shear thinning effects, under the fluid ejection conditions in which composition is moved between the fluid container and the printhead of an inkjet device for example. In some other examples, the compositions can show these same thermal thinning effects, when the compositions are heated during printing, e.g., at the fluid container or at the printhead of an inkjet device. Such non-Newtonian properties allow the compositions to be used for printing via inkjet technologies while achieving superior viscosity upon printing. In some examples, the present non-Newtonian photo-curable ink composition can be thinned by increasing the temperature of the composition. In inkjet printing applications, the ink composition is moved between a fluid container and the printhead of an inkjet device. In these applications, the ink compositions can be heated at the fluid container, between the fluid container and the printhead, or in the printhead, thereby decreasing viscosity allowing for inkjet printing followed by rapid cooling and structured network reformation on a recording medium.

By the term "non-Newtonian composition", it is meant also that the composition comprises a structured network that can have different behavior depending on the force that is applied to the composition. As used herein, "structured network" refers to the three dimensional structure that can be formed, for example, as illustrated herein, by metal oxide particles or by a low molecular weight organic gelator, in the presence of salt via electrostatic interactions and/or physical interactions in the non-Newtonian ink composition. In such examples, the three dimensional structure is dependent upon mechanical and/or thermal forces. The mechanical and/or thermal forces, such as shear energy or heat energy, weaken the structured network resulting in the viscosity changes based on the amount of force applied, as discussed herein. In some examples, the structured network can be considered as a gel. The reformation of a structured network after printing can allow, for the present non-Newtonian inks, a better optical density than achieved by Newtonian ink compositions. Once printed, the structured network forming agent and the salt can re-form a structured network. Further, the ink has a first dynamic viscosity ranging from 25 cps to 10,000 cps at a first state and a second dynamic viscosity ranging from 1 cps to 50 cps at a second state. The first dynamic viscosity is higher than the second dynamic viscosity. As mentioned, these structured systems show non-Newtonian flow behavior, providing useful characteristics for implementation in an ink jet ink because of their ability to shear or thermal thin for jetting. Once jetted, this feature allows the jetted drops to become more elastic-, or gel-like when they strike the media surface. These characteristics can also provide improved media attributes such as colorant holdout on the surface.

In some examples, the non-Newtonian photo-curable ink composition can be an aqueous ink composition, meaning thus that it contains a certain amount of water as solvent. The amount of water in the ink composition is dependent, for example, on the amount of other components of the ink composition. The amount of water in the ink composition includes the amount of water added plus the amount of water in the suspensions and other components of the ink composition. In some examples, the amount of water in the ink composition is in the range of about 10 to about 90 wt % by total weight of the ink composition, in some other example; in the range of about 20 to about 80 wt % by total weight of the ink composition and, in yet some other example, in the range of about 30 to about 70 wt %.

The non-Newtonian photo-curable ink composition as described herein exhibits good printing properties. When used in inkjet printing device, the ink composition results in printed articles that have good bleed, edge acuity, feathering, and superior optical density/chroma (due, for example, to low penetration on the media (paper for example)). Furthermore, the non-Newtonian photo-curable ink composition as described herein can be printed on a broad selection of substrates including untreated plastics, flexible as well as rigid, porous substrates such as paper, cardboard, foam board and textile and has a good adhesion on said variety of substrates. The ink composition has a good viscosity that enables good printing performances and enables the ability to formulate inks suitable for inkjet application. The photo-curable ink composition of the present disclosure enables thus high printing speed and is very well suited for use in digital inkjet printing. When printed on a substrate and cured, said ink composition has improved adhesion to, specifically, on non-polar surfaces, for example. The composition possesses also good scratch resistance and weatherability. It can support high curing speed and has a viscosity enabling good jetting properties.

The non-Newtonian photo-curable ink composition of the present disclosure has the ability to produce high optical density for a lower than usual amount of ink deposited on the page in the same time while providing excellent durability performances. In addition, the non-Newtonian photo-curable ink composition of the present disclosure has excellent printing and durability performances while not requiring, for examples, the use of fixer fluids or the use of a pinning step during the printing process.

Furthermore, the non-Newtonian photo-curable ink composition as described herein has the ability to exhibit high ink efficiency while being independent of the nature of the media used. The ink composition would have thus high ink efficiency while being able to be printed on different substrates. The non-Newtonian photo-curable ink composition can be used on paper substrate, for example, or on other type of media. The ink composition can be used in non-coated recording substrate. Indeed, very often, recording media have a variety of additives and coatings applied thereon in order to provide acceptable quality when used in printing applications. Therefore, the ink composition described herein allows reliable jetting, fast drying and curing, ability to print on various media substrates while having excellent image quality and adhesion. The present non-Newtonian photo-curable ink composition of the present disclosure can thus provide excellent ink efficiency (optical densities) independent of the media used.

The properties of the structured network, e.g., viscosity, can be affected by a number of variables including the type of structured network forming agent, the type of salt, the type of solvents, the amounts of these components, pH, ionic strength, etc.

As used herein, "viscosity" refers to dynamic viscosity unless otherwise stated. It should be noted that for all viscosity measurements herein, unless otherwise stated, 25° C. is the temperature that is used. Such viscosities can be measured using an Anton Paar Rheometer or a CAP2000 rheometer from Brookfield Instruments. As discussed herein, the viscosity for non-Newtonian fluids are not discrete but change based on the thermal or mechanical energy applied to the fluid: the addition of heating and/or mechanical forces can alter, e.g. lower, the viscosity profiles of the inks. For the present inks, the viscosity can be, for examples, measured at two states: at a first and at a second state. Most of the time, the first dynamic viscosity will be higher than the second dynamic viscosity. The "first state" refers when the ink is at a first state, e.g. proximate in time when at rest (subject to shear rate of 5 s$^{-1}$) or at room temperature (e.g. 23-25° C.). The "second state" refers when the ink is at a second state, e.g. proximate in time to when at significant shear (shear rate of 10,000 s$^{-1}$) or at elevated temperature (e.g. 50° C.). The viscosity of the non-Newtonian photo-curable ink composition is thus measured at two states at a first state (e.g. at rest) and at a second state (e.g. at a processing state).

As such, the present composition can be subject to thinning under shear and/or heat in order to reduce the viscosity and allow the inks to be processed in an inkjet printing apparatus. In one example, the viscosity of the first state can be higher than 10,000 cps (such as at least 20,000 cps, at least 100,000 cps, or even at least 500,000 cps). Thus, shearing and/or heating can alter, e.g. lower, the viscosity profiles of the present inks The non-Newtonian photo-curable ink composition of the present disclosure has thus a first dynamic viscosity ranging from 25 cps to 10,000 cps at a first state and a second dynamic viscosity ranging from 1 cps to 50 cps at a second state. The non-Newtonian photo-curable ink composition can also have a first dynamic viscosity ranging from 100 cps to 1,000 cps at a first state and a second dynamic viscosity ranging from 1 cps to 25 cps at a second state.

In some examples, the non-Newtonian photo-curable ink composition has a dynamic viscosity ranging from 25 cps to 10,000 cps at a temperature of 25° C. (first state) and a dynamic viscosity ranging from 1 cps to 50 cps at a temperature of 50° C. (second state). In some other examples, the non-Newtonian photo-curable ink composition has a dynamic viscosity ranging from 100 cps to 1,000 cps at a temperature of 25° C. and a dynamic viscosity ranging from 1 cps to 25 cps at a temperature of 50° C. In addition, the ink composition can have a dynamic viscosity ranging from 25 cps to 10,000 cps at a shear rate of 5 $s^{-1}$ (or 1/s) (first state) and a dynamic viscosity ranging from 1 cps to 50 cps at a shear rate of 10,000 $s^{-1}$ (second state). The ink composition can also have a dynamic viscosity ranging from 25 cps to 2,000 cps at a shear rate of 5 $s^{-1}$ (or 1/s) and a dynamic viscosity ranging from 1 cps to 20 cps at a shear rate of 10,000 $s^{-1}$, when measured at 25° C. At an even higher shear rate range (>50,000-100,000 $s^{-1}$), the dynamic viscosity of the inks can drop further, e.g. from 1 to 10 cps. As such, high shear rates or other mechanical or thermal forces can enable reliable jetting from inkjet printheads.

When little or no dynamic pressure is being applied to the ink to move it through the system or when no heat is being applied to the ink, the ink has a viscous consistency. However, when the normal amount of dynamic pressure (~ at least 10,000 Pascals) is applied to the ink to move it through the inkjet system or when the ink is heated to 50° C. or more, the ink viscosity can change significantly, e.g. from 25 to 1 cps or from 5 to 1 cps. Thus, when such inks are ejected at a high frequency from the fluid container of an inkjet fluid dispensing device, for example, the dynamic viscosities of the inks are at a low level that does not interfere with the ejection process of the inkjet system.

In some examples, the present disclosure refers to an aqueous ink composition having non-Newtonian properties comprising a photo-initiator; a radiation-curable monomer or a radiation-curable polyurethane dispersion; and a structured network that is formed by the interaction between structured network forming agents and salts. The fact that the ink composition has non-Newtonian properties means herein that the viscosity is modified (i.e. reduced) when the composition is submitted to shear and/or heat.

Structured Network Forming Agent

The non-Newtonian photo-curable ink composition comprises a structured network forming agent; by "structured network forming agent" it is meant herein an ingredient that is able to form a structured network and, therefore, that provides a specific viscosity to the ink. The structured network forming agent can also be called herein "gelator" or "gelling agent" since it confers a structure similar to a gel to the ink composition, a gel being a liquid of a rather high viscosity that has difficulties to flow at normal (i.e. room) conditions and temperature.

The structured network forming agent can be present in an amount ranging from about 0.1 wt % to 20 wt % based on the total weight of the non-Newtonian photo-curable ink composition. The structured network forming agent can be present in an amount ranging from about 0.5% to 10 wt % based on the total weight of the non-Newtonian photo-curable ink composition.

The structured network forming agent can be a metal oxide or a low molecular weight organic gelator. In some examples, the structured network forming agent is a low molecular weight organic gelator and the first state and the second state, of the ink composition, correlate to a first temperature of 25° C. and a second temperature of 50° C., respectively. In some other examples, the structured network forming agent is a metal oxide and the first state and the second state, of the ink composition, correlate to a first shear rate of 5 $s^{-1}$ and a second shear rate of 10,000 $s^{-1}$, respectively.

The structured network forming agent can be a metal oxide. As used herein, "metal oxide" refers to a molecule comprising at least one metal (e.g., Al) or semi-metal (e.g., Si) atom and at least one oxygen atom which in a particulate form is able to form a three dimensional structure in the presence of salt dissolved in an organic solvent and/or water, thereby forming a structured network. As used herein "semi-metal" includes boron, silicon, germanium, arsenic, antimony, and tellurium, for example. In one example, the metal oxide can include with limitation aluminum oxide, silicon dioxide, zinc oxide, iron oxide, titanium dioxide, indium oxide, zirconium oxide, or mixtures thereof. As discussed herein, the metal oxide (again which is defined to include both metal and semi-metal oxides) can be present in the non-Newtonian ink composition in an amount ranging from 0.1 wt % to 20 wt % based on the total weight of the non-Newtonian ink composition. In one example, the metal oxide can be present in an amount ranging from about 0.5 wt % to 10 wt % and in one aspect, at from about 1 wt % to 5 wt %, based on the total weight of the non-Newtonian ink composition. Additionally, the particle size of the metal oxide can be varied depending on the desired properties of the non-Newtonian ink composition. For example, the bigger the particle size, the less viscous the non-Newtonian ink composition tends to be. In one example, the particle size can be from 1 nm to 300 nm. In another aspect, the particle size can be from 5 nm to 100 nm or can be from 10 nm to 50 nm.

In some examples, the structured network forming agent is a metal oxide selected from the group consisting of aluminum oxide, silicon dioxide, zinc oxide, iron oxide, titanium dioxide, indium oxide, and zirconium oxide.

Metal oxide particles can, optionally, be dispersed with dispersants. Examples of suitable dispersants include, but are not limited to, water-soluble anionic species of low and high molecular weight such as phosphates and polyphosphates, phosphonates and polyphosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains, phosphate group or carboxylic group. In some examples, the dispersant used to disperse metal oxide particles can be a polyether alkoxysilane or polyether phosphate dispersant. Commercial examples of the polyether alkoxysilane dispersants include, but are not limited to, Silquest®A-1230 manufactured by Momentive Performance Materials and Dynasylan® 4144 manufactured by Evonik/Degussa.

The amount of dispersant used in the metal oxide dispersion may vary from about 1% by weight to about 300% by weight of the metal oxide particles content. In some examples, the dispersant content range is between about 2 to about 150% by weight of the metal oxide particles content. In some other examples, the dispersant content range is between about 5 to about 100% by weight of the metal oxide particles content. The dispersion of metal oxide particles can be prepared via milling or dispersing metal oxide powder in water in the presence of suitable dispersants.

In some examples, the non-Newtonian photo-curable ink composition comprises a structured network forming agent that is a metal oxide and an inorganic salt that is present in an amount of about 0.05 wt % to about 10 wt % based on the total weight of the non-Newtonian photo-curable ink composition.

In some other examples, the non-Newtonian ink composition comprises a metal oxide in an amount ranging from about 0.1 wt % to about 10 wt % based on the total weight of the non-Newtonian ink composition and an inorganic salt in an amount of 0.05 wt % to about 10 wt % based on the total weight of the non-Newtonian ink composition, and an organic solvent.

In some examples, the structured network forming agent is a metal oxide selected from the group consisting of aluminum oxide, silicon dioxide, zinc oxide, iron oxide, titanium dioxide, indium oxide, and zirconium oxide and salt including a carboxylic acid, a cation or an anion. The cation can be selected from the group consisting of sodium, lithium, potassium, magnesium, and calcium. The anion can be selected from the group consisting of nitrate, chloride, sulfate, and acetate. The metal oxide and the salt can be present, in the non-Newtonian inkjet ink, at a metal oxide to salt ratio ranging from about 1:1 to about 5:1 by weight.

The structured network forming agent can be a low molecular weight organic gelator. As used herein, "low molecular weight organic gelator" refers to an organic molecule or oligomer that is able to form a three dimensional structure with a dissolved salt in the presence of an organic solvent and/or water to form a structured network. As used herein "oligomer" refers to a compound comprised of no more than 10 monomer units. Regarding low molecular weight, in one example, the present low molecular weight organic gelators can have a weight average molecular weight of 50 to 10,000 Mw. In one aspect, the weight average molecular weight can be from 100 to 2,000 Mw.

The present low molecular weight organic gelators can include amino acids, which in some examples can be present in the form of peptides, cyclic peptides, etc. In one example, the amino acids can have a protecting group, e.g., an amine protecting group. In one example, the amino acid can be an aliphatic amino acid such as glycine, alanine, valine, leucine, or isoleucine. In another example, the amino acid can be a hydroxyl or sulfur/selenium-containing amino acid such as serine, cysteine, selenocysteine, threonine, or methionine. In still another example, the amino acid can be a cyclic amino acid such as proline. In yet another example, the amino acid can be an aromatic amino acid such as phenylalanine, tyrosine, or tryptophan. In still another example, the amino acid can be a basic amino acid such as histidine, lysine, or arginine. In still yet another example, the amino acid can be an acidic amino acid or amide-containing amino acid such as aspartate, glutamate, asparagine, or glutamine. Such amino acids can be individually functionalized with the presently disclosed protecting groups or can be combined into peptides, including cyclic peptides, with such functionalization. Regarding the amine protecting groups, in one example, the amine protecting group can be a fluorenyl methoxy carbonyl group. In another example, the amine protecting group can be an aromatic protecting group. Other derivatives can include naphthalene or naphthyl based peptides.

The structured network forming agent can be N-(9-fluorenylmethoxycarbonyl)-L-phenylalanine (Fmoc-Phe-OH) or a dipeptide of N-(9-fluorenylmethoxycarbonyl)-L-phenylalanine. Other examples include naphthalene derivatives of N-(9-fluorenylmethoxycarbonyl)-L-phenylalanine. Mono and dipeptides of N-(9-fluorenylmethoxycarbonyl) can be obtained from BaChem Chemicals Co.

In some examples, the structured network forming agent is a low molecular weight organic gelator selected from the group consisting of amino acids, peptides, cyclic peptides, amino acids having a protecting group, peptides having a protecting group, and cyclic peptides having a protecting group and mixtures thereof.

The low molecular weight organic gelator can be present in the non-Newtonian inkjet ink in an amount ranging from about 0.1 wt % to about 20 wt % based on the total weight of the non-Newtonian inkjet ink. The low molecular weight organic gelator can also be present in an amount ranging from about 0.2 wt % to about wt 10%, or from about 0.5 wt % to about 5 wt % based on the total weight of the non-Newtonian inkjet ink composition.

In some examples, the non-Newtonian photo-curable ink composition comprises a structured network forming agent that is a low molecular weight organic gelator wherein the low molecular weight organic gelator and the salt are present in the non-Newtonian inkjet ink at a low molecular weight organic gelator to salt ratio ranging from 1:1 to 1:5 by weight. In some other examples, the non-Newtonian photo-curable ink composition comprises a structured network forming agent that is a low molecular weight organic gelator and that is present in an amount ranging from 1% to 5% by weight based on the total weight of the non-Newtonian inkjet ink, and a salt present in an amount ranging from 1% to 10% by weight based on the total weight of the non-Newtonian inkjet ink.

In some other examples, the non-Newtonian photo-curable ink composition comprises a structured network forming agent that is a low molecular weight organic gelator and a salt that is an organic salt and that is present in an amount of 0.05 wt % to 20 wt % based on the total weight of the ink.

Salt

The non-Newtonian photo-curable ink composition comprised a salt in order to form a structured network. The salt is dissolved in the liquid phase of the ink composition. The salt can be an inorganic salt or an organic salt.

In some examples, the salt is an inorganic salt. In another aspect, the salt is a monovalent inorganic salt. Such monovalent inorganic salts can include sodium, lithium, potassium cations, as well as nitrate, chloride, acetate anions, or mixtures thereof. In another aspect, the salt can be multivalent, i.e. containing multivalent cations or anions or both, such as calcium nitrate, magnesium nitrate, magnesium sulfate and/or mixtures thereof. The salt can be a sodium or potassium acetate. In some examples, the salt is an organic salt containing organic anion. The salt can be an organic salt comprising an organic cation or combination of organic anion and cation. The salt can include salts of carboxylic acids (e.g. sodium or potassium 2-pyrrolidone-5-carboxylic acid), salts of citric acid or any organic acid including aromatic salts, and mixtures thereof. The salt can be a salt of a carboxylic acid.

The salt can be present in the non-Newtonian ink composition in an amount ranging from about 0.05% to about 20% by weight based on the total weight of the non- Newtonian ink composition. In some other examples, the salt can be present in an amount ranging from about 0.1% to about 10%, or in an amount ranging from about 0.5% to about 4%, or in an amount ranging from about 1% to about 2% by weight based on the total weight of the non-Newtonian ink composition.

In some examples, the non-Newtonian photo-curable ink composition comprises a metal oxide as a structured network forming agent in an amount ranging from about 0.1 wt % to about 20 wt % based on the total weight of the ink and an inorganic salt in an amount ranging from about 0.05% to about 10% by weight based on the total weight of the ink. In some other examples, the non-Newtonian photo-curable ink composition comprises a low molecular weight organic gelator as a structured network forming agent in an amount ranging from about 0.1 wt % to about 20 wt % based on the total weight of the ink and an organic salt in an amount ranging from about 0.05% to about 20% by weight based on the total weight of the ink.

In some examples, in the non-Newtonian photo-curable ink composition of the present disclosure, when the structured network forming agent is a metal oxide, the structured network forming agent to salt ratio is ranging from 0.5:1 to 5:1 by weight or ranging from 2:1 to 3:1 in another aspect. In some other examples, in the non-Newtonian photo-curable ink composition of the present disclosure, when the structured network forming agent is a low molecular weight organic gelator, the structured network forming agent to salt ratio is ranging from 1:1 to 1:5 by weight or from 0.5:1 to 2:1 in another aspect.

In some examples, the non-Newtonian photo-curable ink composition comprises a structured network forming agent that is a metal oxide and is selected from the group consisting of aluminum oxide, silicon dioxide, zinc oxide, iron oxide, titanium dioxide, indium oxide, zirconium oxide, and mixtures thereof; and a salt that is a cation selected from the group consisting of sodium, lithium, potassium, magnesium, and calcium; and an anion selected from the group consisting of nitrate, chloride, sulfate, and acetate. In some other examples, the non-Newtonian photo-curable ink composition comprises a structured network forming agent that is a low molecular weight organic gelator and a salt that is a carboxylic acid.

It is believed that the inclusion of a salt, particularly a dissolved salt in ink can contribute to the structure of the ink. In the case of metal oxide as structured network forming agent, it is believed that the salt can act to shield the electrostatic repulsion between particles and permit the van der Waals interactions to increase, thereby forming a stronger attractive potential and resulting in a structured network by providing elastic content to a predominantly fluidic system.

Without being linked by any theory, it is believed that the presence of the salt can impact both the jettability and the response after jetting. In some examples, the salt can be added such that its presence in this system is enough to make an appreciable difference in the printing characteristics of the ink. Higher quality printing can be determined in one aspect by improved optical density (when a colorant is present in the ink). It is believed that, inks with salt can have higher optical densities, while retaining good jettability properties and other properties, such as ink structure, rheological behavior, shear thinning, and jetting of ink drops. Furthermore, salt can also contribute to the gelator inks of the present disclosure having decreased restructuring time after shear or thermal thinning for printing. Higher pre-shear rates can often result in a likewise faster response in the presence of salt. In these instances, a fast restructuring of the ink can mean more solid-like behavior on the media surface in less time with less fluid penetration, and thus better colorant holdout and greater ink efficiency.

Organic Solvent

The non-Newtonian photo-curable ink composition comprises organic solvents and water. The present structured network is formed in a liquid phase containing an organic solvent. As used herein, "organic solvent" refers to any organic solvent or mixture thereof. As such, the term organic solvent includes systems of solvents. The present organic solvents are in addition to any water present in the non-Newtonian ink composition. Without being linked by any theory, it is believed that the solvent has many functions such as, for examples, helping with drop reliability and providing decap performance, but also helping to have a good paper curl control.

In some examples, the organic solvent is present, in the non-Newtonian photo-curable ink composition of the present disclosure, in an amount ranging from about 3% to about 50% by weight based on the total weight of the ink composition. In other some examples, the organic solvent is present in an amount ranging from 5% to 40% or ranging from about 10% to 30% by weight based on the total weight of the ink composition.

The non-Newtonian photo-curable ink can also be an aqueous inkjet ink where the organic solvent is present in an amount ranging from 5% to 50% by weight based on the total weight of the non-Newtonian gel-based inkjet ink.

Examples of organic solvents that can be used include methanol, ethanol, propanol, iso-propanol, a glycol ether having at least about four carbon atoms, C4-8 alcohols, 1-methoxy-2-propanol, 2-methoxy ethanol, 2-ethoxy ethanol, 1-methoxy-2-acetoxy propane, ethyl lactate, a glycol ether (optionally having at least about 10 carbon atoms), a dihydric alcohol (optionally having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-Bis(2-Hydroxyethyl)-5,5-Dimethylhydantoin (Dantocol®DHE), 2-methyl-1,3-propanediol (MPdiol), ethylhydroxy-propanediol (EHPD), glycerol, 1,5-pentanediol, 1,2-pentanediol, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof. Additionally, organic solvents can be classified as network participating solvents and network non-participating solvents. As used herein, "network participating solvent" refers to organic solvents that increase viscosity of the non-Newtonian ink composition, measured at any functional shear rate. As used herein, "network non-participating solvent" refers to organic solvents that decrease the viscosity of the non-Newtonian ink composition, measured at any functional shear rate. As such, the present non-Newtonian ink compositions can be altered based on the types of organic solvents used. For example, when the non-Newtonian ink composition comprises a network participating solvent, the structured network can be strengthened, e.g., the viscosity of the non-Newtonian ink composition can be increased. However, when a network non-participating solvent is used, the structured network can be weakened, e.g., the viscosity of the non-Newtonian ink composition can be decreased. In one example, network participating solvents can include ethylhydroxy-propanediol (EHPD), glycerol, 1,5pentanediol, ethylene glycol, triethylene glycol, and mixtures thereof. In another example, network non-participating solvents can include 2-pyrrolidinone, 1,2 pentanediol, MPdiol, 1,2 hexanediol, and mixtures thereof. As such, the structured network properties, and resultant non-Newtonian ink composition properties can be modified by mixing and matching particular organic solvents. In one example, the organic solvent comprises a mixture of a network participating solvent and a network non-participating solvent. Additionally, the present inks can contain a significant amount of organic solvent, including network participating solvents and/or network non-participating solvents. In some examples, the organic solvent is a network participating solvent selected from the group consisting of ethylhydroxy-propanediol, glycerol, 1,5 pentanediol, ethylene glycol, triethylene glycol, and mixtures thereof; or the organic solvent is a network non-participating solvent selected from the group consisting of 2-pyrrolidinone, 2-hydroxyethyl-2-pyrrolidinone, 1,2 pentanediol, 2-methyl-1,3-propanediol, 1,2 hexanediol, and mixtures thereof.

Polymerizable Material

The non-Newtonian photo-curable ink composition comprises polymerizable materials. Such polymerizable material can be, for example, a radiation-curable polyurethane dispersion or a radiation-curable monomer. As "radiation-curable", it is meant that the polyurethane dispersions or the monomers can be cured by exposure to actinic radiation such as photo-radiation, e.g., ultraviolet (UV) radiation. The curing step will result in a formation of a cross-linked polymer network. The source of radiation can be, for example ultraviolet (UV) light, electrons beam energy, and/ or the like. Without being linked by any theory, it is believed that the presence of the polymerizable material will provide some durability performances to the ink composition containing it.

In some examples, the polymerizable material can be present in an amount representing from about 0.5 wt % to about 20 wt % by total weight of the non-Newtonian photo-curable ink composition. In some other examples, the polymerizable material can be present in an amount representing from about 1 wt % to about 10 wt % by total weight of the non-Newtonian photo-curable ink composition.

The polymerizable material can include a radiation curable or UV-curable polyurethane dispersion, i.e. UV-PUD. As polyurethane dispersion, it is meant herein polyurethane particles that are dispersed in a liquid vehicle. In some examples, polyurethane dispersions (PUD) are stable dispersions, in water, of polyurethane polymer particles whose size ranges from about 20 to about 200 nm. The polyurethane polymer may be a polyether-based polyurethane, a polyester-based polyurethane, or a polycarbonate-based polyurethane. In some examples, the polyurethane dispersions can have a weight average molecular weight in the range of about 1,000 to 100,000 or in the range of about 5,000 to about 50,000.

In some examples, the polyurethane polymer is a methacrylated polyurethane pre-polymer (A) obtained from the reaction of at least one polyisocyanate compound (i); optionally at least one polyol (ii); at least one hydrophilic compound (iii) containing at least one reactive group which is capable of reacting with isocyanate groups and rendering the polyurethane pre-polymer dispersible in an aqueous medium either directly or after the reaction with a neutralizing agent to provide a salt; at least one methacrylated compound (iv) containing at least two reactive groups capable of reacting with isocyanate groups; and at least one methacrylated compound (v) containing essentially one reactive group capable of reacting with isocyanate groups. This methacrylated polyurethane pre-polymer may be included in an aqueous composition which may, in some instances, also include at least one ethylenically unsaturated compound (B) (i.e., a component including carbon-carbon double bonds which under the influence of irradiation and/or a photo-initiator can undergo radical polymerization). This forms a pre-polymer composition that can be neutralized by the addition of either triethylamine or potassium hydroxide.

A polyurethane polymer dispersion is formed by either adding the pre-polymer composition to water, or by adding water to the pre-polymer composition under constant agitation. In an example, the polyurethane polymer dispersion includes a total amount of methacrylated and, optionally, polymerizable ethylenically unsaturated groups ranging from 1 to 8 meq per total weight in g of (i), (ii), (iii), (iv), (v) and (B). In an example, the polyurethane polymer dispersion includes from about 35 wt % to about 40 wt % of the solid polyurethane dispersed in water.

Examples of the polyisocyanate compound (i) include organic compounds comprising at least two isocyanate groups, and in some instances, not more than three isocyanate groups. The polyisocyanate compound can be selected from aliphatic, cycloaliphatic, aromatic and/or heterocyclic polyisocyanates or combinations thereof. Polyol (ii) may be any polyol including at least two hydroxyl groups. The polyol (ii) can be selected from high molecular weight polyols having a number average molecular weight of at least 400 but not exceeding 5000, low molecular weight polyols having a number average weight of lower than 400, or any mixtures thereof. Examples of such high molecular weight polyols are polyester polyols, polyether polyols, polycarbonate polyols, fatty dimer diols, polybutadiene polyols, silicone polyols and polyacrylate polyols, as well as combinations thereof. The hydrophilic compound (iii) can be a polyol including a functional group that can exhibit an ionic or non-ionic hydrophilic nature. In an example, the hydrophilic compound (III) is a polyol containing one or more anionic salt groups, such as a carboxylate and sulfonate salt groups or acid groups which may be converted to an anionic salt group, such as carboxylic acid or sulfonic acid groups. Specific examples include hydroxycarboxylic acids, such as citric acid, malic acid, lactic acid, tartaric acid, 2,2-dimethylolpropionic acid, and 2,2-dimethylolbutanoic acid. The methacrylated compound (iv) includes compounds that contain at least one methacrylated function, such as an acrylic or methacrylic group, and at least two nucleophilic functions capable of reacting with isocyanate, preferably hydroxyl functions. Examples include methacryloyl dihydroxy compounds and poly-methacryloyl dihydroxy compounds. The methacrylated compound (v) may be any compound including at least one unsaturated function, such as acrylic or methacrylic group, and one nucleophilic function capable of reacting with isocyanate, such as a hydroxyl group. Examples include methacryloyl mono-hydroxy compounds, such as poly-methacryloyl mono-hydroxy compounds. The ethylenically unsaturated compound (B) can be selected from the methacrylated compounds (iv) and (v) as described here above or can be an ethylenically unsaturated compound which include no functionality which is capable to react with an isocyanate group.

A few commercially available polyurethane polymer dispersions are in accordance with the details provided herein, and may also be used in the examples disclosed herein. As an example, Alberdingk® LUX 260 (Alberdingk Boley) may be used as the polyurethane polymer dispersion that is incorporated into the non-Newtonian photo-curable ink composition.

In some examples, the polymerizable materials are polyurethane polymer dispersions. In some other examples, the polymerizable materials are water-dispersible acrylic functional polyurethane dispersions. In some other examples, the polymerizable materials are water-dispersible methacrylated polyurethane dispersions. By water-dispersible methacrylated polyurethane is meant herein a polymer that, when mixed with water, can form a two-phase system of small particles dispersed in water. Water-dispersible methacrylated polyurethane can be, water-dispersible resins, such as, for examples, compounds commercialized under the name of Ucecoat®6558, Ucecoat®6559, Ebecryl®2002 and Ebecryl®2003 available from Cytec.

The UV curable polyurethane dispersions can be present, in the composition, in an amount ranging from about 1 wt % to about 20 wt % by total weight of the non-Newtonian photo-curable ink composition. In some other examples, UV curable polyurethane dispersions is present in the ink composition in an amount ranging from about 3 wt % to about 25 wt % by total weight of the non-Newtonian photo-curable ink composition. In yet some other examples, the UV curable polyurethane dispersions is present in the composition in an amount ranging from about 5 wt % to about 10 wt % by total weight of the non-Newtonian photo-curable ink composition.

In some other examples, the polymerizable material, present in the non-Newtonian photo-curable ink composition, can be a radiation-curable monomer. Such radiation-curable monomer can be a hydrophobic radiation-curable monomer or a water-soluble or water-miscible radiation curable monomers.

The amount of radiation-curable monomers to be incorporated into the non-Newtonian photo-curable ink composition can vary within a wide range depending upon the intended use of the resultant composition. The radiation-curable monomer can be present, for examples, at a level of about 1 to about 15% by weight based on the total weight of the ink composition. In some other examples, the radiation-curable monomer is present in an amount representing from about 2 to about 10 wt % based on the total weight of the ink composition.

In some examples, the non-Newtonian photo-curable ink composition described herein includes one or more water-soluble or water-miscible radiation curable monomers as polymerizable material. As water-soluble or water-miscible radiation curable monomers, it is meant herein any radiation curable monomers that have sufficient water solubility and hydrolytic stability. Such monomer should be capable of being polymerized by radiation and should be soluble or miscible in water.

The water-soluble or water-miscible radiation curable monomers may be mono-, di-, tri-, tetra- or otherwise multifunctional in terms of radiation curable moieties. Examples of suitable water-soluble monomers include esters of acrylic or methacrylic acid with polyethylene glycol or with a mono-, di-, tri- or tetra-hydric alcohol derived by ethoxylating a mono-, di, tri- or tetra-hydric aliphatic alcohol of molecular weight less than 200 with ethylene oxide. Representative and non-limiting examples of water-soluble or water-miscible monomers include polyethylene glycol (600) diacrylate, polyethylene glycol (400) diacrylate, methoxy polyethylene glycol (550) mono-acrylate, polyethylene glycol (6) mono-acrylate, 30 ethoxylated bisphenol-A diacrylate, ethoxylated (20) trimethylopropane-triacrylate, (15) ethoxylated trimethylopropane-triacrylate, tris-tryl phenol 18eo acrylate, glycerol 12eo triacrylate. The water-soluble radiation curable monomers can be ethoxylated tri-methylpropane triacrylate or acrylamide monomers. In some examples, the polymerizable materials are ethoxylated tri-methylpropane triacrylate or acrylamide monomers.

Suitable commercially available water-soluble or water-miscible radiation curable monomers include materials available from Sartomer such SR415® (ethoxylated (20) trimethylolpropane-triacrylate), CN435® or SR9015®.

Other examples of commercially available water-soluble or dispersible monomers include: CD550® (methoxy polyethylene glycol (350) mono-methacrylate), CD552® (methoxy polyethylene glycol (550) mono-methacrylate), SR259® (polyethylene glycol (200) diacrylate), SR344® (polyethylene glycol (400) diacrylate), SR610® (polyethylene glycol (600) diacrylate), SR252® (polyethylene glycol (600) di-methacrylate), SR604® (polypropylene glycol mono-methacrylate, all available from Sartomer; Ebecryl®11 (polyethylene glycol diacrylate), and Ebecryl®12 (polyether triacrylate) available from UCB; Genomer®1251 (polyethylene glycol 400 diacrylate), Genomer®1343 (ethoxylated trimethylolpropane triacrylate), Genomer® 1348 (glycerol-propoxy triacrylate), Genomer®1456 (polyether polyol tetra-acrylate), and diluent 02-645 (ethoxy ethyl acrylate), all available from Rahn.

In some other examples, water-soluble radiation curable monomers are acrylamide monomers. Representative and non-limiting examples of acrylamide water-soluble or water-miscible monomers include N-(2-hydroxyethyl) acrylamide; N,N'-methylene bis-acrylamides and/or N-isopropyl acrylamides. Commercially available water-soluble or dispersible monomers include, for examples, Flocryl®MBA available from SNF FLOERGER (France); Jarchem®HEAA or Jarchem®NNDMA both available from Jarchem (USA, NJ).

In some other examples, the non-Newtonian photo-curable ink composition described herein includes one or more hydrophobic radiation-curable monomers as polymerizable material. The hydrophobic radiation-curable monomers may be mono-, di-, tri-, tetra- or otherwise multifunctional in terms of radiation-curable moieties. In some examples, the hydrophobic radiation-curable monomers are hydrophobic monofunctional radiation-curable monomers. In some other examples, the hydrophobic radiation-curable monomers are acrylate monomers or vinyl monomers. The monofunctional hydrophobic radiation-curable monomers can be acrylate monomers. The acrylate monomer can be selected from the group consisting of 2-phenoxyethyl acrylate, isophoryl acrylate, isodecyl acrylate, tridecyl acrylate, lauryl acrylate, 2-(2-ethoxy-ethoxy)ethyl acrylate, tetrahydrofurfuryl acrylate, isobornyl acrylate, propoxylated acrylate, tetrahydrofurfuryl methacrylate, 2-phenoxyethyl methacrylate, isobornyl methacrylate and combinations of two or more thereof. Monofunctional hydrophobic radiation-curable monomers can be vinyl monomers. Vinyl monomer can be selected from the group consisting of vinyl caprolactam, vinyl ether and any combinations thereof. In some examples, hydrophobic radiation-curable monomers used herein are the ones that do not require labeling with Xi or any other danger symbol, like, for example, 2-phenoxy-ethylacrylate, available from Sartomer under the tradename SR339C.

In some examples, the polymerizable materials are hydrophobic radiation-curable monomers that are selected from the group consisting of vinyl caprolactams, hexanediol diacrylates, trimethylolpropane triacrylates and propoxylated neopentyl glycol diacrylates. In some other examples, hydrophobic radiation-curable monomers are vinyl caprolactams. In yet some other examples, the polymerizable materials are low molecular weight monomers such a, for examples, N-vinylcaprolactam, N-vinyl-2-piperidone, vinylsulfonic acid sodium salt, 2-Propene-1-sulfonic acid sodium salt, 2-Sulfoethyl methacrylate, 3-Sulfopropyl methacrylate potassium salt, N-[2-(N,N-dimethylamino)ethyl] methacrylamide or Methacryloyl-L-Lysine.

The hydrophobic radiation-curable monomers can be hydrophobic multifunctional radiation-curable monomers. Examples of such higher functional, radiation-curable monomers include hexanediol diacrylate, ethoxylated bisphenol A diacrylate, trimethylolpropane triacrylate, tris(2-hydroxyethyl) isocyanurate triacrylate, combinations of these, and the like. In some examples, multifunctional radiation-curable used herein are the ones that do not require labeling with Xi or any other danger symbol, like propoxylated neopentyl glycol diacrylate, available from Sartomer under the tradename SR 9003.

Photo-Initiator

The non-Newtonian photo-curable ink composition described herein includes a photo-initiator. The photo-initiator, or UV initiator, is an agent that initiates a reaction (i.e. polymerization) upon exposure to a desired wavelength of UV light to cure the ink composition, as described herein, after its application to an ink-receiving material or substrate. In some examples, the photo-initiator is a radical photo-initiator. The photo-initiator may be a single compound or a mixture of two or more compounds. It can be present, in the ink composition, in an amount sufficient to cure the applied ink composition. In some examples, the photo-initiator is present in an amount representing from about 0.01 to about 10 wt %, or from about 0.5 to about 5 wt % by weight, or from about 1 to about 2 wt % by weight, based on the total weight of the non-Newtonian photo-curable ink composition.

The photo-initiator can be a water-soluble or a water-dispersible photo-initiator and is incorporated into the aqueous phase of the ink composition. In some examples, the photo-initiator is a hydrophobic photo-initiator and is incorporated into the hydrophobic radiation-curable monomers. The hydrophobic monomer may be incorporated into the UV-PUD during synthesis and/or to the ink by emulsification. In some other examples, the photo-initiator is dissolved within the hydrophobic radiation-curable monomers. The photo-initiator may be a combination of few photo-initiators, which absorb at different wavelengths.

Examples of radical photo-initiator include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl) phosphine oxide, phenyl bis(2,4,6-trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, or combinations of two or more of the above. Amine synergists may also be used, such as, for example, ethyl-4-dimethylaminobenzoate, 2-ethylhexyl-4-dimethylamino benzoate.

In some examples, the photo-initiator is a bis-acyl phosphine oxide type photo-initiator or a α-(alpha)-hydroxyketone type photo-initiator. In some other examples, the photo-initiator is a 1-[4-(2-hydroxyethoxy)-phenyl]-2-hydroxy-2-methyl-1-propane-1-one (such as Irgacure®2959 available from BASF). Other examples of suitable photoinitiators include α-aminoketones, monoacylphosphine oxides, diacylphenylphosphine oxide, etc.

The photo-curable ink composition may include a UV stabilizer, i.e. an agent that can assist with scavenging free radicals. Examples of UV stabilizers include, by way of illustration and not limitation, quinine methide (Irgastab®UV 22 from BASF Corporation) and Genorad®16 (Rahn USA Corporation) and combinations thereof.

Examples of commercially available photo-initiator can be found under the trade name Irgacure® for the BASF Corporation.

In some examples, a photosensitizer may be used with the photo-initiator in amounts ranging from about 0.01 to about 10 wt %, or from about 1 to about 5 wt %, based on the total weight of the ink composition. A photosensitizer absorbs energy and then transfers it to another molecule, usually the photo-initiator. Photosensitizers are often added to shift the light absorption characteristics of a system. Suitable examples of photosensitizers include, but are not limited to thioxanthone, 2-isopropylthioxanthone and 4-isopropylthioxanthone.

Colorant

The present non-Newtonian photo-curable ink composition can include one or more colorants that impart the desired color to the printed item and/or to the ink. In some examples, the non-Newtonian photo-curable ink composition further comprises a colorant. Such colorants can be pigments and/or dyes. In one aspect, the colorant is a pigment, and in another aspect, the colorant is a dispersed pigment. In some examples, the ink compositions include one or more pigments as colorants. The pigments can be self-dispersed pigments, polymer-coated pigments, or common pigments such as milled pigments, for example. A separate dispersing agent may be used to enable appropriate suspension of the pigment in the ink composition. The particulate pigment may be inorganic or organic. The pigment can be of any color including, but not limited to, black, blue, brown, cyan, green, white, violet, magenta, red, orange and yellow, as well as spot colors from mixtures thereof. In some other examples, the colorant can be a dye, including one or more of the many water soluble dyes that are typically used in the inkjet arts. Examples include direct dyes, vat dyes, sulphur dyes, organic dyes, reactive dyes, disperse dyes, acid dyes, azoic dyes, or basic dyes. In yet other examples, the colorant can be a mixture of a pigment and a dye.

Examples of organic pigments that may be present in the photo-curable ink composition include, by way of illustration and not limitation, perylene, phthalocyanine pigments (for example, phthalo green, phthalo blue), cyanine pigments (Cy3, Cy5, and Cy7), naphthalocyanine pigments, nitroso pigments, mono-azo pigments, di-azo pigments, di-azo condensation pigments, basic dye pigments, alkali blue pigments, blue lake pigments, carbon black pigments, phloxin pigments, quinacridone pigments, iso-indolinone pigments, di-oxazine pigments, carbazole di-oxazine violet pigments, alizarine lake pigments, phthaloxy amine pigments, carmine lake pigments, tetrachloroisoindolinone pigments, perinone pigments, thio-indigo pigments, anthraquinone pigments and quinophthalone pigments, and mixtures of two or more of the above and derivatives of the above. Inorganic pigments that may be present in the ink composition, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), metal sulfides, metal chlorides, and mixtures of two or more thereof.

The pigment component can be a dispersible pigment, such as, for example, pigment available under the trade names Paliotol®, Heliogen®, Chromophtal®, Irgalite®, Cinquasia® (available from BASF), Hostaperm®, Novoperm® (available from Clariant), Sunfast®, Quindo® (available from SunChemical), Special Black (available from Degussa), Kronos® (available from Kronos), Kemira® (available from Kemira Pigments).

The amount of colorant in the photo-curable ink composition depends on a number of factors, for example, the nature of the colorant, the nature of the use of the ink composition, the nature of the jetting mechanism for the ink, and the nature of any additives, for example. The ink composition may contain up to 20 wt % of colorant. In some example, the amount of colorant in the photo-curable ink composition is from about 0.1 to about 20 wt %, or from about 1 to about 15 wt %, or from about 2 to about 10 wt %, or from about 3 to about 7 wt %.

In some examples, the non-Newtonian photo-curable ink composition contains pigments as colorants that show little or no settling in the fluid container or printhead during the times when the ink is not moving through the system or when the ink is not heated.

Other Components and Additives

In some examples, the non-Newtonian photo-curable ink composition of the present disclosure can include a sugar alcohol. The sugar alcohol can be any type of chain or cyclic sugar alcohol. The sugar alcohol can have the formula: $H(HCHO)_{n+1}H$ where n is at least 3. Such sugar alcohols can include, for examples, without limitation erythritol (4-carbon), threitol (4-carbon), arabitol (5-carbon), xylitol (5-carbon), ribitol (5-carbon), mannitol (6-carbon), sorbitol (6-carbon), galactitol (6-carbon), fucitol (6-carbon), iditol (6-carbon), inositol (6-carbon; a cyclic sugar alcohol), volemitol (7-carbon), isomalt (12-carbon), maltitol (12-carbon), lactitol (12-carbon), and mixtures thereof. In some examples, the sugar alcohol is a 5 carbon sugar alcohol or a 6 carbon sugar alcohol. In some other examples, the non-Newtonian photo-curable ink composition of the present disclosure can include a sorbitol.

Such sugar alcohol can be present in the non-Newtonian inkjet ink in an amount ranging from about 1% to about 25% by weight based on the total weight of the non-Newtonian inkjet ink or can be present in an amount ranging from about 5% to about 15% by weight, or from 7.5% to 15% by weight. Without being linked by any theory, it is believed that the addition of the sugar alcohol provides improved optical density as well as excellent curl and rub/scratch resistance to the non-Newtonian photo-curable ink composition containing it.

Other components and additives may be present in the photo-curable ink composition in order to improve ink properties and performances. The additives include, but are not limited to, one or more of surfactants, dispersing agents, rheology modifiers, biocides, anti-foaming agents, and UV stabilizers. In some examples, the photo-curable ink composition of the present disclosure further contains one or more additives selected from the group consisting of surfactant, dispersing agent, UV stabilizer, de-foaming agent, rheology modifiers and biocides. The total amount by weight of additives in the ink composition is, for example, from about 0.1 to about 10 wt %, or from about 0.2 to about 5 wt %, or from about 1 to about 4 wt %.

Surfactants include, for example, those commercially available under the brand names: WET® and GLIDE® (from Evonik Tego Chemie GmbH, Essen, Germany); BYK® (from BYK Chemie GmbH, Wesel, Germany); Dynax® (from Dynax Corp. Pound Ridge N.Y.); 3M Novec® (from 3M Energy and Advanced Materials, St. Paul Minn.); and Zonyl® FSO (from DuPont de Nemours Company, Wilmington Del.). Examples of anti-foaming agents are those commercially available under the brand names: Foamex® and Twin® (from Evonik Tego Chemie Service GmbH); BYK® (from BYK Chemie GmbH); and Surfynol® (from Air Products and Chemicals, Inc.). Examples of dispersants include high molecular weight copolymers with groups having an affinity for a pigment. Specific examples of dispersants include those commercially available from BYK Chemie GmbH under the brand names BYK®. Examples of rheology modifiers include those commercially available under the brand names: Acrysol® (from Rohm & Haas); Borchigel® (from OMG Borchers GmbH, Langenfield, Germany); BYK® (from BYK Chemie GmbH); and DSX® (from Cognis GmbH, Monheim am Rhein, Germany).

Manufacturing Method

Example of a method of manufacturing a non-Newtonian photo-curable ink composition comprise: adding a structured network forming agent to a solvent-containing vehicle to form a solution or dispersion; adding a salt into the organic solvent-containing vehicle; adding a photo-initiator and a polymerizable material, in order to produce a composition comprising a structured network forming agent in an amount ranging from about 0.1 wt % to about 20 wt % by total weight of the ink composition; a salt in an amount ranging from about 0.05 wt % to about 20 wt % by total weight of the ink composition; an organic solvent; a photo-initiator, and a polymerizable material and having a first dynamic viscosity ranging from 25 cps to 10,000 cps at a first state and a second dynamic viscosity ranging from 1 cps to 50 cps at a second state; subjecting the combination to conditions under which the ink composition becomes substantially uniform; and subjecting the combination to filtration.

The present method can further comprise mixing a colorant into the non-Newtonian photo-curable ink composition. In one example, the colorant can be a pigment. As discussed herein, such pigments can be self-dispersed or can further include dispersants, e.g., a polymer dispersant. In another example, the colorant can be a dye, or a mixture of pigment and dye.

Within these examples, the structured network forming agent (a low molecular weight organic gelator or a metal oxide, for example) is present in an amount ranging from 0.1 wt % to 20 wt % by weight based on the total weight of the non-Newtonian photo-curable ink composition; the salt is present in an amount of 0.05% to 20%; and the organic solvent is present in an amount ranging from 5% to 50% by total weight based on the total weight of the non-Newtonian photo-curable ink composition.

The structured network forming agent, the salt, and organic solvent can be in the organic solvent-containing vehicle in amounts sufficient to form a structured network, as well as in order to provide a first dynamic viscosity ranging from 25 cps to 10,000 cps at a first state and a second dynamic viscosity ranging from 1 cps to 50 cps at a second state. When the structured network forming agent is a metal oxide, it can be treated with a dispersing agent, milled in solvents, or combinations thereof. In one example, the metal oxide can be treated with an alkoxysilane and milled to provide a specific particle size. The organic solvent-containing vehicle can include the organic solvents described herein (network participating and/or non-network participating), and in some examples, include water, e.g., aqueous systems. The ingredients can be added together or in any order. Heating steps can be used to dissolve or disperse ingredients as needed.

The present disclosure refers therefore to a method for preparing the above mentioned non-Newtonian photo-curable ink composition. The method includes providing, in combination, a structured network forming agent, a salt, an organic solvent; a photo-initiator and a polymerizable material; subjecting the combination to conditions under which the ink composition becomes substantially uniform and have viscosity and surface tension suitable for being jetted; and subjecting the combination to filtration.

In some examples, conditions for rendering the ink composition to a substantially uniform dispersion include, for example, agitation such as, e.g., one or more of mixing, stirring, shaking, homogenizing, sonication, ultra-sonication, micro-fluidization, bead milling, and blending, for example, or a combination of the above. The phrase "substantially uniform" means that there is no visible phase separation and that the ink composition applied by draw down results in a uniform film without visible defects such as de-wetting, clustering, or air bubbles, for example. The ink composition may be filtered to remove large particles that may prohibit reliable jetting. Filtration may be carried out using, by way of illustration and not limitation, one or more of membrane filtration, surface filtration, depth filtration, screen filtration, for example.

Printing Method

The present non-Newtonian photo-curable ink composition can be used in conjunction with multiple imaging systems, non-limiting examples of which include thermal inkjet system, piezo inkjet system or liquid electrophotographic printing (LEP) system. The non-Newtonian photo-curable ink composition that are described herein are useful in standard inkjet printing systems. The present ink compositions can be inkjet printed as the viscosity of the non-Newtonian inkjet inks are lowered using thermal control or mechanical control within a printing system, e.g., an inkjet printhead. Once exiting the printhead, the viscosity of the present non-Newtonian inkjet inks rapidly increases (e.g. within few seconds) via self-assembly of a structured network within the non-Newtonian inkjet inks.

A method of printing a non-Newtonian photo-curable ink composition can comprise: subjecting a non-Newtonian photo-curable ink composition, having a first dynamic viscosity ranging from 25 cps to 10,000 cps, to sufficient thermal energy or mechanical energy to generate a second dynamic viscosity ranging from 1 cps to 50 cps, wherein the non-Newtonian photo-curable ink comprises a structured network forming agent in an amount ranging from about 0.1 wt % to about 20 wt %, a salt in an amount of about 0.05 wt % to about 20 wt %, an organic solvent; a photo-initiator and a polymerizable material; providing a media substrate; ejecting droplets of the non-Newtonian photo-curable ink composition while at the second dynamic viscosity; and applying photo energy to the ink composition once printed on the media substrate, said photo energy having a frequency and energy level suitable for curing the photo-curable ink composition.

In some examples, the method of printing a non-Newtonian photo-curable ink composition further comprises a drying step where the ink is dried after printing or jetting ink the ink composition on the substrate and prior to the curing step.

The method of printing the non-Newtonian photo-curable ink composition can comprise subjecting the non-Newtonian ink composition, having a first dynamic viscosity ranging from 25 cps to 10,000 cps at room temperature, to sufficient thermal energy or mechanical energy in order to generate a second dynamic viscosity ranging from 1 cps to 50 cps. The shear or thermal thinning can occur to jet the ink from the inkjet architecture in one example. In some other examples, the method further includes ejecting droplets of the non-Newtonian inkjet ink while at the second dynamic viscosity. The steps of subjecting and ejecting can be carried out sequentially or simultaneously.

In some examples, the method of printing a non-Newtonian photo-curable ink composition comprises shearing a non-Newtonian photo-curable ink composition, which has a first dynamic viscosity ranging from 25 cps to 10,000 cps at a shear rate of 5 $s^{-1}$, within a printhead of an inkjet printing apparatus at a shear rate of 10,000 $s^{-1}$ or more to provide a second dynamic viscosity ranging from 1 cps to 50 cps, wherein the ink composition comprises a structured network forming agent in an amount ranging from about 0.1 wt % to about 20 wt %, a salt in an amount of about 0.05 wt % to about 20 wt %, an organic solvent, a photo-initiator, and a polymerizable material; providing a media substrate; ejecting droplets of the non-Newtonian photo-curable ink composition; and applying photo energy to the ink composition once printed on the media substrate, said photo energy having a frequency and energy level suitable for curing the photo-curable ink composition.

In some other examples, the method of printing a non-Newtonian photo-curable ink composition comprises heating a non-Newtonian photo-curable ink composition, which has a first viscosity ranging from 100 cps to 10,000 cps at a temperature of 25° C., to a temperature of at least 50° C. to provide a second viscosity ranging from 1 cps to 10 cps, wherein the ink composition comprises a structured network forming agent in an amount ranging from 0.1 wt % to 20 wt %, a salt, an organic solvent, a photo-initiator, and a polymerizable material; providing a media substrate; ejecting droplets of the ink composition onto said media; and applying photo energy to the ink composition once printed on the media substrate, said photo energy having a frequency and energy level suitable for curing the photo-curable ink composition.

In some examples, the projection of stream of droplets of ink composition, onto the media substrate, is done via inkjet printing techniques. The ink composition may be established on the material via any suitable printing techniques, such techniques include thermal, acoustic, continuous and piezo-electric inkjet printing. In inkjet printing devices, liquid ink drops are applied in a controlled fashion to an ink-receiving substrate, or media substrate, by ejecting ink droplets from a plurality of nozzles, or orifices, in a printhead of an inkjet printing device or inkjet printer. In drop-on-demand systems, a droplet of ink is ejected from an orifice directly to a position on the surface of an ink-receiving substrate, or media substrate, by pressure created by, for example, a piezoelectric device, an acoustic device, or a thermal process controlled in accordance with digital data signals. For inkjet printing, the ink composition can be heated or chilled to an appropriate dispensation temperature, prior to ejecting the ink composition to the surface of a substrate. In some examples, the projection of stream of droplets of ink composition, onto the media substrate, is done via a piezoelectric printhead.

For inkjet printing, the ink composition is heated or chilled to an appropriate dispensation temperature prior to ejecting the ink composition to the surface of a substrate. The particular temperature and viscosity of the ink composition is dependent on, for example, the particular method and equipment for conducting the inkjet printing.

The present printed or jetted ink may be dried after jetting the ink composition in a predetermined pattern onto the substrate in view of evaporating the water content of the ink. The drying stage may be conducted, by way of illustration and not limitation, by hot air, electrical heater or light irradiation (e.g., IR lamps), or a combination of such drying methods. In order to achieve a targeted performance level, it is advisable to dry the ink at a maximum temperature allowable by the substrate that enables good image quality without substrate deformation. Consequently, the substrate deformation temperature should not be exceeded while drying. Examples of a temperature during drying is from about 40° C. to about 150° C., or about 50° C. to about 80° C., for example. The ink composition according to the principles herein enables printing on plastic materials while drying at relatively low temperatures of about 40° C. to about 70° C., or about 50° C. to about 60° C., for example, and while achieving fast drying time and good image quality.

According to the printing method, once established on the media substrate, the printed or jetted ink composition is cured by applying photo energy to the ink composition. Said photo energy having a frequency and energy level suitable for curing the non-Newtonian photo-curable ink composition. In such curing step, a mercury or similar lamp can be used in order to fully cure and cross link the ink composition to the media substrate. For applying photo energy, the non-Newtonian photo-curable ink composition, on the media substrate, may be subjected to suitable light sources for curing the ink compositions in accordance with the principles described herein. Ultraviolet (UV) radiations can be used to cure the ink composition as described above. Curing radiation can be UV radiation radiated by UV lamps, blue lasers, UV lasers, or ultraviolet LEDs, for example. The curing radiation may be provided by a source of ultraviolet radiation operating in a continuous mode. The curing radiation may also be provided by a source of ultraviolet operating in a flash or pulsed mode. In some examples, the ink composition is cured by using, for example, a wide arc mercury lamp, in order to fully cure and crosslink the ink.

In accordance with the principles described herein, the photo-curable ink compositions find uses as ink compositions for inkjet printers. In some examples, the photo-curable ink compositions may be dispensed to the surface of a broad range of substrates employing inkjet technology and equipment. A suitable inkjet printer, according to the present method, is an apparatus configured to perform the printing and ink curing processes. The printer may be a single pass inkjet printer or a multi-pass inkjet printer. The printer may include a temperature stabilization module operative to ensure maintenance of the range of ink jetting temperatures.

As mentioned, the photo-curable ink composition is jetted onto a media substrate. The media substrate may be planar, either smooth or rough, or have any other shape that is suitable for the particular purpose for which it is employed. The media substrate can have a thickness in the range of about 0.1 mm to about 10 mm or in the range of about 1 mm to about 5 mm. The media substrate may be porous or non-porous, rigid, semi-rigid, or flexible, for example. Planar media substrates may be in the form, for example, of a film, plate, board, or sheet by way of illustration and not limitation. Examples of media substrate include, but are not limited to, plastic substrates (for example, polyethylene terephthalate, polyethylene, polystyrene, polypropylene, polycarbonate, and acrylic), paper, paper laminated with plastic (for example, polyethylene, polypropylene, or polystyrene), cardboard, paperboard, foam board, and textiles. The media can also be rigid PVC (polyvinylchloride rigid substrate) or PETG (Polyethylene Terephthalate Glycol-modified). In some examples, the media substrate is non-porous and has low surface tension. Non-limiting examples include plastics, PVC, banner paper, and polypropylenes, and synthetic paper, such as Yupo® synthetic paper. Banner paper is specifically configured for printing banners, has a smooth surface, and is often designed for color printing. The term "non-porous" includes surfaces that can have relatively poor water permeability, absorption, and/or adsorption. Vinyl and other plastic sheets or films, metals, coated offset media, glass, and other similar substrates are considered non-porous. In some embodiments, the media substrate can be a plastic substrate. In some other embodiments, the media substrate is a rigid plastic substrate. In some examples, the media substrate is a polypropylene, a polyvinyl chloride (PVC), an acrylic or a polycarbonate substrate. In some other examples, the media substrate is a polyvinyl chloride (PVC) or a polycarbonate substrate. The media substrates can be non-swellable and/or are non-polar. By non-swellable, it is meant herein that the substrate surface is not swelled by any components of the ink, and no chemical bonds are formed between ink and substrate. By non-polar, it is meant herein that the substrate surface is charge-neutral, therefore adhesion to it is difficult to achieve.

EXAMPLES

Ingredients:

TABLE 1

| Ingredient name | Nature of the ingredient | supplier |
| --- | --- | --- |
| aluminum oxide | Dispersed aluminum oxide of 20 nm (pH = 4.5; 25% pigment of SCA Silquest ®A1230) | Momentive Corporation |
| Sodium Nitrate | Inorganic salt | Sigma-Aldrich |
| Irgacure ®2959 | Photo-initiator | BASF |
| N-vinylcaprolactam | Hydrophobic monomers | BASF |
| N-vinyl-2 piperidone | Hydrophobic monomers | BASF |
| SR415 ® | ethoxylated trimethylolpropane triacrylate - Water soluble monomer | Sartomer |
| Neorad ®R441 | aliphatic acrylated Urethane oligomer - UV-PUD | DSM |
| Cab-O-jet ®465M | Magenta pigment | Cabot Corporation |

TABLE 1-continued

| Ingredient name | Nature of the ingredient | supplier |
|---|---|---|
| Alberdingk ® LUX 260 | UV-PUD | Alberdingk Boley |
| 2-Pyrrolidinone | organic solvent | Alfa Aesar |
| FMOC-PHE | N-(9-Fluorenylmethoxycarbonyl)-L-phenylalanine | Sigma-Aldrich |
| 2-Ethyl-2-(hydroxymethyl)-1,3-propanediol (EHPD) | organic solvent | Sigma-Aldrich |

Example 1

Ink Composition

Different non-Newtonian photo-curable inkjet ink compositions are prepared with the components and the amounts as listed in Table 2. All amounts are percentages expressed in wt % of the total weight of the ink composition.

TABLE 2

| Components | Ink #1 | Ink #2 | Ink #3 | Ink #4 | Ink #5 | Ink #6 | Ink #7 |
|---|---|---|---|---|---|---|---|
| Aluminum Oxide | 3 | 3 | 3 | 3 | 3 | — | — |
| Sodium Nitrate | 1.5 | 1.5 | 1.5 | 1.5 | 1.5 | — | — |
| FMOC-PHE | — | — | — | — | — | 1 | 1 |
| 2-pyrrolidone 5-carboxylic acid | — | — | — | — | — | 2.5 | 1.5 |
| EHPD | 10 | 10 | 10 | 10 | 10 | 6 | 10 |
| 2-Pyrrolidinone | 10 | 10 | 10 | 10 | 10 | 6.5 | 10 |
| Cab-O-jet ® 465M | 4 | 4 | 4 | 4 | 4 | 4 | 4 |
| N-vinyl caprolactam | 8 | — | — | — | — | 8 | 8 |
| N-vinyl-2-piperidone | — | 8 | — | — | — | — | — |
| SR415 ® | — | — | 8 | — | — | — | — |
| Neorad ® R441 | — | — | — | 8 | — | — | — |
| Alberdingk ® LUX 260 | — | — | — | — | 10 | — | — |
| Irgacure ® 2959 | 1 | 1 | 1 | 1 | 1 | 1 | 1 |
| Water | Balance | Balance | Balance | Balance | Balance | Balance | Balance |
| pH | 10 | 10 | 10 | 10 | 10 | 9 | 9 |

Example 2

Print Performances

The ink compositions 1 to 7 are printed on different paper-based media (HP® Multipurpose Paper—ColorLok® (International Paper Company; Staples Copy Paper (Made from Staples), Georgia Pacific copy paper (Georgia Pacific) and also on a porous media substrate (corrugated board). Printing is performed at various percentages with 1200× 1200 dpi and various ink flux (ng/300 dpi).

The ink compositions are printed using a HP printer. The jetting step is followed by 1 min drying under hot air at a temperature of about 40° C. Immediately after drying, the printed image is cured by passing the printed image under a broad range UV lamp once at a print speed of about 0.5 m/s. The drying step is performed using a resistive heater with convection. The curing step is performed using conveyor curing unit (from Uvexs Inc.).

The resulting printed articles are evaluated for their adhesion performance and print quality (OD). Adhesion testing is performed according to ASTM 3359 "Measuring Adhesion by Tape Test". Cuts are made to the printed sample by a cross hatch cutter such as Elcometer®1542 Cross Hatch Adhesion Tester (Elcometer Inc., Rochester Hills, Mich.). Adhesive tape (3M Scotch® tape 250), is placed and smoothed over the cut area. The tape is then removed rapidly in one movement and the cut area is inspected. The results are reported according to the removal of ink from the substrate. The print quality (or ink efficiency) is evaluated by measuring the Optical density of the image (as OD provided by mass of ink). The optical densities are measured using Gretag Macbeth® Spectrolino densitometer.

The results of these tests demonstrate that the ink compositions according to the present disclosure have excellent print quality (ink efficiency) and show improved adhesion performances; such results being independent of the type of media used: treated (ColorLok®) and untreated paper (Staples Copy Paper).

The invention claimed is:

1. A non-Newtonian photo-curable ink composition, comprising:
   a. a structured network forming agent in an amount ranging from about 0.1 wt % to about 20 wt % by total weight of the ink composition,
   b. a salt in an amount ranging from about 0.05 wt % to about 20 wt % by total weight of the ink composition,
   c. an organic solvent,
   d. a photo-initiator,
   e. and a polymerizable material,
wherein the ink composition has a first dynamic viscosity ranging from 25 cps to 10,000 cps at a first state and a second dynamic viscosity ranging from 1 cps to 50 cps at a second state; and
wherein one of:
   the structured network forming agent is a metal oxide and the salt includes:
      a cation selected from the group consisting of sodium, lithium, potassium, magnesium, and calcium; and
      an anion selected from the group consisting of nitrate, chloride, sulfate, and acetate; or
   the structured network forming agent is a low molecular weight organic gelator and the salt is selected from the group consisting of salts of carboxylic acids, salts of citric acid, organic acids including aromatic salts, and mixtures thereof.

2. The non-Newtonian photo-curable ink composition of claim 1, wherein the ink composition has a dynamic viscosity ranging from 25 cps to 10,000 cps at a temperature of 25° C. and a dynamic viscosity ranging from 1 cps to 50 cps at a temperature of 50° C.

3. The non-Newtonian photo-curable ink composition of claim 1, wherein the ink composition has a dynamic viscosity ranging from 25 cps to 10,000 cps at a shear rate of 5 s$^{-1}$ and a dynamic viscosity ranging from 1 cps to 50 cps at a shear rate of 10,000 s$^{-1}$ measured at 25° C.

4. The non-Newtonian photo-curable ink composition of claim 1 wherein the structured network forming agent is the metal oxide and wherein the salt is an inorganic salt that is present in an amount of about 0.05 wt % to about 10 wt % based on the total weight of the non-Newtonian photo-curable ink composition.

5. The non-Newtonian photo-curable ink composition of claim 1 wherein the structured network forming agent is the low molecular weight organic gelator and wherein the salt is an organic salt that is present in an amount of 0.05% to 20% by weight based on the total weight of the ink.

6. The non-Newtonian photo-curable ink composition of claim 1 wherein the structured network forming agent is the low molecular weight organic gelator, and wherein the low molecular weight organic gelator is selected from the group consisting of amino acids, peptides, cyclic peptides, amino acids having a protecting group, peptides having a protecting group, cyclic peptides having a protecting group, and mixtures thereof.

7. The non-Newtonian photo-curable ink composition of claim 1 wherein the structured network forming agent is the metal oxide, and wherein the metal oxide is selected from the group consisting of aluminum oxide, silicon dioxide, zinc oxide, iron oxide, titanium dioxide, indium oxide, and zirconium oxide.

8. The non-Newtonian photo-curable ink composition of claim 1 wherein the polymerizable material is a radiation-curable monomer or a radiation-curable polyurethane dispersion.

9. The non-Newtonian photo-curable ink composition of claim 1 wherein the polymerizable materials are polyurethane polymer dispersions that are water-dispersible methacrylated polyurethane dispersions.

10. The non-Newtonian photo-curable ink composition of claim 1 wherein the polymerizable materials are hydrophobic radiation-curable monomers selected from the group consisting of vinyl caprolactams, hexanediol diacrylates, trimethylolpropane triacrylates and propoxylated neopentyl glycol diacrylates.

11. The non-Newtonian photo-curable ink composition of claim 1 wherein the polymerizable materials are ethoxylated tri-methylpropane triacrylate or acrylamide monomers.

12. The non-Newtonian photo-curable ink composition of claim 1 wherein the organic solvent is a network participating solvent selected from the group consisting of ethylhydroxy-propanediol, glycerol, 1,5 pentanediol, ethylene glycol, triethylene glycol, and mixtures thereof; or the organic solvent is a network non-participating solvent selected from the group consisting of 2-pyrrolidinone, 2-hydroxyethyl-2-pyrrolidinone, 1,2 pentanediol, 2-methyl-1,3-propanediol, 1,2 hexanediol, and mixtures thereof.

13. The non-Newtonian photo-curable ink composition of claim 1 further comprising a colorant.

14. A method for manufacturing a non-Newtonian photo-curable ink composition comprising:
a. adding a structured network forming agent to an solvent-containing vehicle to form a solution or dispersion; adding a salt into the organic solvent-containing vehicle; adding a photo-initiator and a polymerizable material, in order to produce a composition comprising a structured network forming agent in an amount ranging from about 0.1 wt % to about 20 wt % by total weight of the ink composition; a salt in an amount ranging from about 0.05 wt % to about 20 wt % by total weight of the ink composition; an organic solvent; a photo-initiator, and a polymerizable material and having a first dynamic viscosity ranging from 25 cps to 10,000 cps at a first state and a second dynamic viscosity ranging from 1 cps to 50 cps at a second state;
b. subjecting the combination to conditions under which the ink composition becomes substantially uniform;
c. and subjecting the combination to filtration;
wherein one of:
the structured network forming agent is a metal oxide and the salt includes:
a cation selected from the group consisting of sodium, lithium, potassium, magnesium, and calcium; and
an anion selected from the group consisting of nitrate, chloride, sulfate, and acetate; or
the structured network forming agent is a low molecular weight organic gelator and the salt is selected from the group consisting of salts of carboxylic acids, salts of citric acid, organic acids including aromatic salts, and mixtures thereof.

15. The non-Newtonian photo-curable ink composition of claim 1 wherein the structured network forming agent is the low molecular weight organic gelator and wherein the salt is selected from the group consisting of sodium 2-pyrrolidone-5-carboxylic acid, potassium 2-pyrrolidone-5-carboxylic acid, and mixtures thereof.

16. The non-Newtonian photo-curable ink composition of claim 1 wherein the polymerizable materials are low molecular weight monomers selected from the group consisting of N-vinylcaprolactam, N-vinyl-2-piperidone, vinylsulfonic acid sodium salt, 2-propene-1-sulfonic acid sodium salt, 2-sulfoethyl methacrylate, 3-sulfopropyl methacrylate potassium salt, N-[2-(N,N-dimethylamino)ethyl] methacrylamide, and methacryloyl-L-Lysine.

17. The non-Newtonian photo-curable ink composition of claim 1 wherein the structured network forming agent is the metal oxide, and wherein the metal oxide is dispersed with an alkoxysilane.

18. The non-Newtonian photo-curable ink composition of claim 1 wherein the structured network forming agent is N-(9-fluorenylmethoxycarbonyl)-L-phenylalanine, a dipeptide of N-(9-fluorenylmethoxycarbonyl)-L-phenylalanine, or a naphthalene derivative of N-(9-fluorenylmethoxycarbonyl)-L-phenylalanine.

* * * * *